Figure 1:
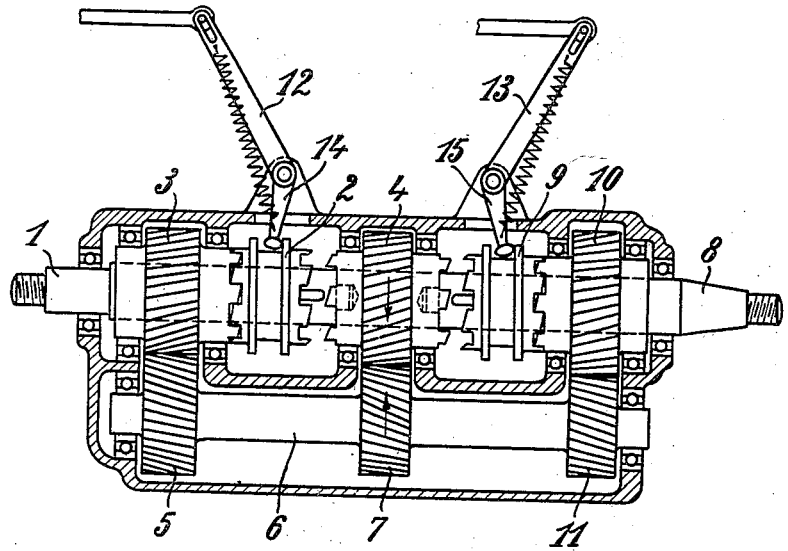

Inventor:
Karl Maybach

Patented Feb. 27, 1934

1,949,167

UNITED STATES PATENT OFFICE 1,949,167

CHANGE SPEED GEARING

Karl Maybach, Friedrichshafen, Germany, assignor to Maybach-Motorenbau G. m. b. H., Friedrichshafen, Bodensee, Germany Application March 12, 1931, Serial No. 521,925
In Germany March 31, 1930

1 Claim. (Cl. 74—59)

My invention relates to change speed gearing, especially to gears of this kind as used in automobiles and the like. It has special reference to the kind of two speed gears as disclosed in my U. S. Patent Re. 17,707.

In this patent a special type of two speed gears is disclosed which allows for operation (change of speed) without disconnecting the main clutch situated as usual between the motor and the speed gear, simply by setting the operating member, taking the gas off the motor and giving gas again. This effect is reached by means of a pair of claw couplings which are coupled alternately and the teeth of which have front faces so inclined that the coupling halves coming into contact at first do not engage but rattle past each other until the originally faster half becomes the slower one or vice versa. Two speed gears of this type may be used alone or in connection with any other type of change speed gears.

According to the present invention two such change speed gears are combined so that it becomes possible to change between four different speeds without being obliged to disconnect the main friction clutch. To this end three pairs of constantly meshing gears are so arranged that two pairs of claw couplings may connect the necessary members. The claw couplings are constructed with teeth in the above described manner with inclined front faces. This new change speed gear is extraordinarily compact and allows for four silent speed changes without touching the main clutch, which means a considerable improvement over the existing change speed gears.

Having given a general description of my invention I now want to point it out more in detail referring to the drawing which represents an example embodying my invention.

Figure 2:
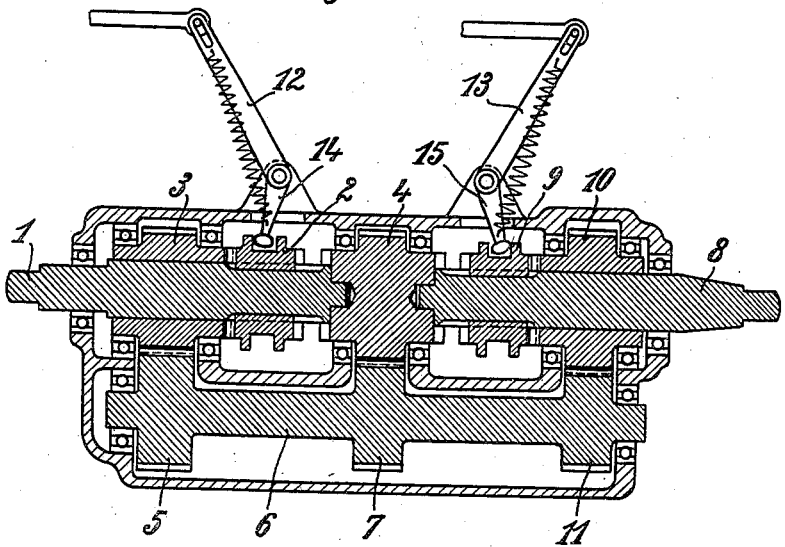

Fig. 1 is a longitudinal section through the gear case of a change speed gear showing the gears and other members in side view, whereas Fig. 2 is the corresponding longitudinal section through the shafts and gears of the same change speed gear.

Shaft 1 is driven by the motor. Splined to it is sleeve 2 which can be shifted to come into engagement with gear 3 or with gear 4. Gear 3 loosely surrounds shaft 1 and meshes with gear 5 fixed to countershaft 6. Gear 4 meshes with gear 7 also fixed to countershaft 6.

Splined to driven shaft 8 is a second sleeve 9 adapted to be shifted to come into engagement with gear 4 or with gear 10 which loosely surrounds shaft 8 and meshes with gear 11 fixed to countershaft 6.

The intermediate shaft portion carrying the gear 4 is bored to receive and support the ends of the shafts 1 and 8.

Spring tensioned mechanisms 12 and 13 serve for making certain that levers 14 and 15 together with their respective sleeves 2 and 9 do not take an idling middle position but are alternately tensioned toward one or the other of their two end positions, respectively.

The turning direction of the shafts and gears is indicated by arrows in Fig. 1.

The teeth of the claw couplings have inclined front faces as is to be seen from Fig. 1. This inclination is such that upon adequate operation of the operating members the coupling halves coming into contact do not engage but rattle past each other until the originally faster half rotates slower than the originally slower half or vice versa.

In the example represented gear 3 in diameter is smaller than gear 4 and gear 4 smaller than gear 10, so that gear 5 is larger than gear 7 and gear 7 larger than gear 11.

Consequently the slowest speed is set when sleeve 2 connects shaft 1 with gear 3 and at the same time sleeve 9 connects gear 10 to shaft 8, as represented in the figures.

To get to the second speed lever 15 must be tensioned to move sleeve 9 to the left by adequately setting the tensioning mechanism 13. As long as there is driving force on the right hand coupling of sleeve 9 this coupling will not disengage because of the frictional resistance, but as soon as the driver takes the gas off the motor sleeve 9 moves to the left and the couplings halves of sleeve 9 and gear 4 come into contact but at first do not engage as sleeve 9 is rotating slower than gear 4 because of the relative size of gears 10 and 4. But the gas being taken off the motor shaft 1 and consequently also gear 4 will lose in speed of rotation faster than shaft 8 and sleeve 9 which are driven by the on-rolling vehicle with its great momentum. Thus, within a short time sleeve 9 will overrun gear 4 and then both members come to a final engagement. When the driver now gives gas again the second speed is working, shaft 1 driving shaft 8 by means of gears 3, 5, 7 and 4.

By re-shifting sleeve 9 to the right and by shifting sleeve 2 to the right the third speed is attained which works from shaft 1 over gears 4, 7, 11 and 10 to shaft 8.

If now sleeve 9 is re-shifted to its left-hand position a direct connection between shaft 1 and shaft 8 is reached by means of gear 4 forming the connecting member between both shafts. This position represents the fourth speed or direct drive.

With all of the speed changes it happens that at first the respective claw coupling halves do not engage because of the inclination of the front faces of the claw teeth, as this is explained above with the first speed change. If the inclinations were made different the two halves running at very different speeds would suddenly come into engagement and the shock connected therewith would possibly cause the breaking of one or the other force transmitting member. But as designed this is never possible and a smooth and shockless engagement of the claw coupling halves having substantially the same speed of rotation is warranted. The means for shifting the sleeves and for operating the claw couplings may be any mechanism of mechanical or other type; but I prefer to make use of hydraulic pressure or of vacuum for this purpose and to provide the operating lever for controlling such means on the steering wheel of the automobile.

I do not want to be limited to the details described or shown in the drawing as many variations will occur to those skilled in the art.

What I claim is:

A change speed gear comprising a drive shaft and a driven shaft disposed in axial alignment with their ends in spaced relation having means for effecting four driving speeds therebetween and permitting change from one speed to another without disconnecting the drive shaft from its driving source, said means including an intermediate shaft portion interposed between the drive and driven shafts and having a support independent of said shafts, a main shaft train comprising freely rotatable gears carried one by each of the shafts together with a coaxial intermediate gear fixed to the intermediate shaft portion, the intermediate shaft portion having an axial recess at each end bored to receive and support the respective shaft ends, double acting claw clutch sleeves splined one to each shaft and shiftable therealong in opposite directions alternately to cause driving connection between its shaft and the gear thereon or the intermediate gear together with tensioning means urging each of the clutch sleeves alternately towards one or the other of its driving positions to prevent more than momentary interruption in the operation of the gearing, the claw clutches both having teeth with inclined front faces adapted on shifting from one speed to another to momentarily retard driving connection between each of the clutch sleeves and their coacting gears until the relative rotative direction of the parts is reversed and permitting the several clutch sleeves singly or together under the influence of the tensioning means to be shifted independently of each other from one to the other of their driving positions without disconnecting the drive shaft from its driving source, and a stub shaft having fixed thereto a series of gears each of which is in constant mesh with one of the gears in the main shaft train.

KARL MAYBACH.